Figures 1, 2, 3:
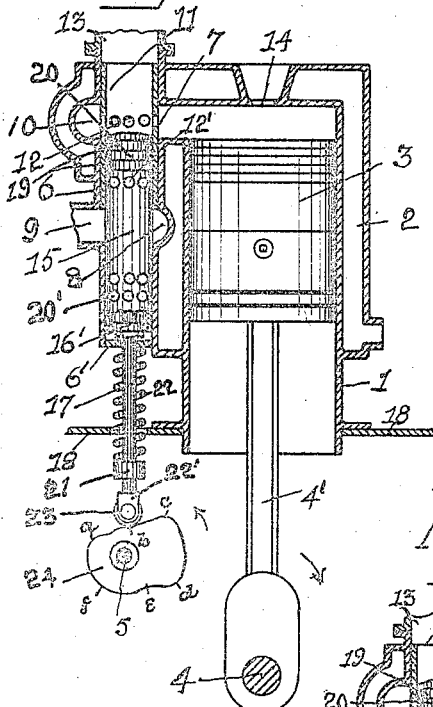

G. W. MOSER.
COMBINED INTAKE AND EXHAUST VALVE FOR INTERNAL COMBUSTION ENGINES.
APPLICATION FILED FEB. 19, 1912.

1,075,594.

Patented Oct. 14, 1913.

2 SHEETS—SHEET 1.

WITNESSES.
C. H. Wilson
W. F. Lewis

INVENTOR
George W. Moser
by Robt. B. Wilson
Attorney

G. W. MOSER.
COMBINED INTAKE AND EXHAUST VALVE FOR INTERNAL COMBUSTION ENGINES.
APPLICATION FILED FEB. 19, 1912.
1,075,594.
Patented Oct. 14, 1913.
2 SHEETS—SHEET 2.
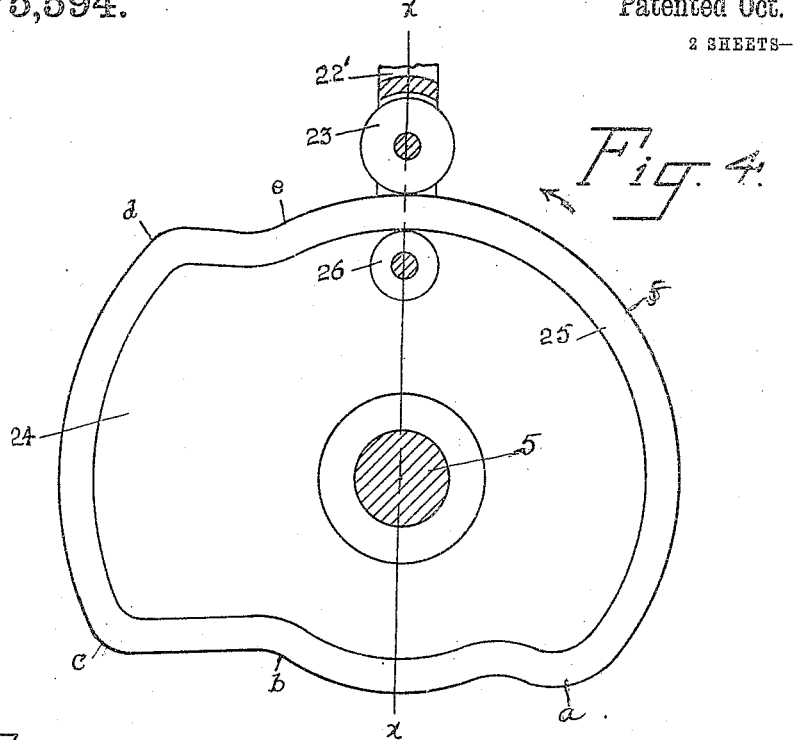
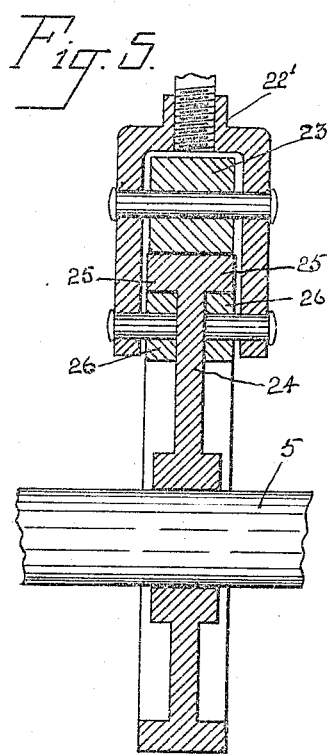
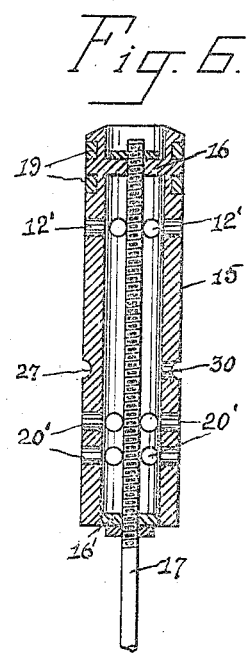

UNITED STATES PATENT OFFICE.

GEORGE W. MOSER, OF PERRYSBURG, OHIO.

COMBINED INTAKE AND EXHAUST VALVE FOR INTERNAL-COMBUSTION ENGINES.

1,075,594.

Specification of Letters Patent.   Patented Oct. 14, 1913.

Application filed February 19, 1912. Serial No. 678,699.

*To all whom it may concern:*

Be it known that I, GEORGE W. MOSER, a citizen of the United States, residing at Perrysburg, in the county of Wood and State of Ohio, have invented new and useful Improvements in Combined Intake and Exhaust Valves for Internal-Combustion Engines, of which the following is a specification.

My invention relates to a combined intake and an exhaust valve for internal combustion engines of the four cycle type, and has for its object to provide an engine of the kind with a piston valve adapted to close the intake port and to open the exhaust port at the beginning of and keep it open during the exhaust stroke of the piston, then close the exhaust port and open the intake port at the beginning of and keep it open during the intake stroke, then close both the inlet and the exhaust ports at the end of the intake stroke and keep them closed during the compression stroke and during the expansion stroke, and then open the exhaust port at the end of the expansion stroke and keep it open during the exhaust stroke.

A further object is to provide an engine of the class described, with an efficient valve of the kind that avoids the noise and injurious wear incident to the separate spring controlled intake and exhaust valves commonly used to effect the relative periodic opening and closing of the intake and exhaust ports.

I accomplish these objects by the construction and combination of parts as hereinafter described and illustrated in the drawings, in which—

Figure 1 is a longitudinal diametric section of a cylinder and valve of an engine constructed in accordance with my invention, showing the position of the valve during and at the completion of the exhaust stroke of the piston. Fig. 2 is a similar view showing the position of the valve during and at the end of the intake stroke of the piston. Fig. 3 is a similar view showing the position of the valve during the compression stroke, the firing of the charge, and the expansion stroke of the piston. Fig. 4 is an enlarged side view of the cam operating the valve stem, and of the roller bearing head and roller engaging the cam, partly in section. Fig. 5 is a section of Fig. 4 on line *x—x*, and Fig. 6 is a longitudinal section of the valve piston, enlarged.

In the drawings 1 designates the main cylinder, having a water jacket 2, 3 the piston, 4 the crank shaft, 4' the connecting rod, 5 the cam shaft, 6 the valve cylinder connected by a side port 7 with the top end portion of the cylinder 1, and having its central portion provided with an annular semi-tubular enlargement 8, having a tubular nipple 9 forming a connection for the carbureter (not shown) and a similar semi-tubular enlargement 10 opposite the side port 7 and connected thereby with the cylinder.

The bore of the valve cylinder 6, above the annular enlargement 8 is of increased diameter and is provided with a bushing 11, the bore of which is of equal diameter with the bore of the cylinder 6 below the enlargement 8. The lower end of the cylinder 6 is provided with a closure 6'. Opposite the enlargement 10 of the cylinder 6 the bushing 11 is provided with a series of port holes 12. The upper end of the cylinder 6 is flanged and has connected thereto as an extension the exhaust pipe 13. In the upper end of the main cylinder is provided an orifice 14 opposite a recess in the water jacket for the attachment of the spark plug, (not shown).

In the bore of the cylinder 6 and of its bushing 11 is an elongated tubular piston 15 having end closures 16 and 16' centrally through which extends the valve stem 17, which extends through the end closure 6' and the top 18 of the crank case (the remainder of which is not shown). The upper end portion of the valve piston 15 is provided with the packing rings 19 on opposite sides of a portion 20, adapted with the rings to form a closure for the port holes 12 of the bushing 11, and below and adjacent to the lower packing ring the valve piston is provided with a series of port holes 12' adapted to be registered with the port holes 12 of the bushing 11.

In the lower end portion of the piston 15 is provided one or more series of port holes 20', which are located to register with the annular enlargement 8 of the cylinder bore when the port holes 12' are in register with the port holes 12 of the bushing 11.

On the valve stem 17 between a fixed collar 21 and the end closure 6' is a helical spring 22, and or the lower end of the stem is fixedly mounted a bifurcated bearing head 22' in which is journaled the roller 23, which engages a cam 24 mounted on the cam shaft 5, which is connected to the main crank so as to be revolved at one half the speed of the main shaft.

The cam 24 is of such form and is so adjusted relative to the crank of the main shaft that the roller 23 of the valve stem is in engagement therewith between the points $a$ and $b$ during the upward exhaust stroke of the piston 3, during which time the valve piston remains at its lowest position fully opening the port holes 12 of the bushing 11 of the valve cylinder, thereby allowing free exhaust through the port 7, the annular enlargement 10, the port holes 12 and the exhaust tube 13, during the entire upward exhaust stroke. At the beginning of the downward intake stroke the roller 23 is in engagement with the cam 24 between the points $b$ and $c$, whereby the valve piston is quickly raised by the cam to the position shown in Fig. 2, with the port holes 12' in register with the port holes 12 of the bushings 11 and the port holes 20' in register with the annular enlargement 8 of the valve cylinder, and between the points $c$ and $d$ of the cam the valve remains in the same position during the downward intake stroke of the piston 3, at the end of which stroke and the beginning of the upward compression stroke the roller 23 is moved quickly downward by the helical spring 22 as the point $d$ of the cam passes the roller 23 to the position shown in Fig. 3, in which position the valve piston 15 closes the port holes 12 and remains in such position during the entire upward compression stroke of the piston 3 and while the portion of the cam between the points $e$ and $f$ passes the roller, at which latter point the compressed charge is fired and also remains in the same position as the portion of the cam between the points $f$ and $a$ passes the roller 23 during which time the piston 3 completes its downward expansion stroke. At the end of the expansion stroke and the beginning of the upward exhaust stroke of the piston 3, the point $a$ of the cam passes the roller 23, and the piston valve 15 quickly moves downward to the position shown in Fig. 1, opening the ports 12 and releasing the exhaust, in which position it remains while the piston 3 completes its upward exhaust stroke, and while the portion of the cam 23 between the points $a$ and $b$ passes the roller 23.

Preferably the cam 24 is provided with the opposite flanges 25 increasing its face, and the bifurcations of the bearing head 22' are extended below the flanges 25, and provided with the rollers 26, which engage the inner faces of the flanges 25. When so constructed the helical spring 22 is omitted.

Preferably also the valve piston 15 is provided as shown in Figs. 2 and 6 with an annular oiling groove 27, opposite which there is connected to the valve cylinder 6 an oil pipe 28, which extends downward into the crank case and has its lower end 29 curved upward and made funnel shape, whereby oil is splashed therein by the crank. Opposite the connection of the pipe 28 with the cylinder 6 the groove 27 is provided with a port hole 30 through the wall of the piston 15, whereby when the ports 12' and 20' of the piston are respectively in register with the ports 12 and the intake, as shown in Fig. 2, oil is drawn into the groove 27, and the valve piston is thereby lubricated. It is manifest, however, that said special means for oiling the valve cylinder and valve piston (shown in Figs. 2 and 6,) may be omitted as in Figs. 1 and 3, and the said parts may be connected into a general system (not shown) for oiling the engine, without departing from the principle of construction and operation of my invention, and I therefore do not limit myself to the use of the special oiling means shown and described.

By the construction shown and described I control both the intake and exhaust ports by a single valve which is practically noiseless in its operation and avoids the pounding effect of the puppet valve ordinarily used to control the exhaust port and the injurious wear requiring frequent grinding of the puppet valve in its seat.

What I claim to be new is—

1. The combination with the main cylinder, piston and crank shaft of an internal combustion engine, said main cylinder having a side port in its top end portion, of a valve cylinder open at its upper end, and having an outlet port in its top end portion connected with the side port of the main cylinder, and an intake port centrally of its length adapted to be connected to a carbureter, a tubular valve piston closed at its ends, and having an outlet port in its top end portion adapted to be registered with the outlet port of the valve cylinder, and having an end portion above the outlet port adapted to close the outlet port of the valve cylinder, and a port in the central portion adapted to register with the intake port of the valve cylinder when the outlet port of the valve piston is registered with the outlet port of the valve cylinder, a cam shaft connected to the crank shaft and adapted to be revolved thereby at one half the speed of the crank shaft, a cam on the cam shaft, and means operatively connecting the valve piston with the cam, said cam being adapted to reciprocate the valve piston in the valve cylinder relative to the stroke of the piston of the main cylinder, substantially as set forth.

2. The combination with a main cylinder, piston, crank shaft and exhaust pipe of an internal combustion engine, of a valve cylinder having an annular groove enlargement of its bore at its top end portion connected by a side port to the top end portion of the main cylinder, and connected at its top end to the exhaust pipe, an annular groove enlargement of its bore at its central portion and a side intake port intersecting the central groove, a cam shaft connected to the crank shaft as set forth, a cam on the cam shaft, a tubular valve piston reciprocable in the valve cylinder, said valve piston having a top end portion adapted to close the top annular groove from the exhaust pipe, a series of port openings adjacent to the top end portion adapted to be brought into and out of register with the top annular groove, and a series of ports in its central portion adapted to register with the central annular groove when the top series of ports are in register with the top annular groove, and a stem operatively connecting the valve piston with the cam, said cam being adapted to reciprocate the valve piston, relative to the strokes of the main piston, substantially as set forth.

3. The combination with the main cylinder, piston and crank case of an internal combustion engine, of a valve cylinder having an intake port adapted to be connected to a carbureter, an outlet port connecting it with the top end portion of the main cylinder, and an oil pipe connecting the cylinder with the crank case, a tubular valve piston reciprocable in the valve cylinder having ports simultaneously registerable respectively with the intake and outlet ports of the valve cylinder, said valve piston being provided with an annular groove adapted to be registered with the oil pipe, when the ports of the piston are in register with the ports of the cylinder and having a port into the bore of the valve piston diametrically opposite the oil pipe.

4. The combination with the main cylinder, piston, crank shaft and exhaust pipe of an internal combustion engine, of a valve cylinder having its upper portion provided with a bore of increased diameter, an annular groove enlargement at its top end portion connected by a side port to the top end portion of the main cylinder, and connected at its top end to the exhaust pipe, a bushing in the upper portion of the valve cylinder, having a bore of equal diameter with the lower portion, said bushing having a series of ports at intervals opposite the annular groove, said valve cylinder being also provided with an annular groove enlargement of its bore at its central portion and a side intake port intersecting the central groove, a cam shaft connected to the crank shaft, as set forth, a cam on the cam shaft, a tubular valve piston reciprocable in the valve cylinder, said valve piston having a top end portion provided with packing rings, and adapted to close the ports of the bushing, a series of port openings adjacent to the top end portion adapted to be brought into and out of register with the port openings of the bushing, and a series of ports in its central portion adapted to register with the central annular groove when its top series of ports are in register with the ports of the bushing, and a stem operatively connecting the valve piston with the cam, said cam being adapted to reciprocate the valve piston relative to the strokes of the main piston, substantially as set forth.

In witness whereof I, GEORGE W. MOSER, of Perrysburg, county of Wood and State of Ohio, have hereunto set my hand this 13th day of February, 1912, in the presence of two subscribing witnesses.

GEORGE W. MOSER.

In presence of—
NEVIN O. WINTER,
C. H. WILSON.

Copies of this patent may be obtained for five cents each, by addressing the "Commissioner of Patents, Washington, D. C."